(12) United States Patent
Huang et al.

(10) Patent No.: US 8,253,602 B2
(45) Date of Patent: Aug. 28, 2012

(54) KEYBOARD WITH CIRCUIT FOR CLEARING CMOS DATA

(75) Inventors: Chung-Chi Huang, Taipei Hsien (TW); Hai-Qing Zhou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 218 days.

(21) Appl. No.: 12/872,694

(22) Filed: Aug. 31, 2010

(65) Prior Publication Data
US 2012/0044096 A1 Feb. 23, 2012

(30) Foreign Application Priority Data
Aug. 18, 2010 (CN) .......................... 2010 1 0256353

(51) Int. Cl.
*H03K 17/94* (2006.01)
*H01H 13/76* (2006.01)
*B41J 5/00* (2006.01)

(52) U.S. Cl. .................. 341/22; 200/5 A; 400/479.1
(58) Field of Classification Search .................. 341/22; 200/5 A, 600; 400/479.1
See application file for complete search history.

(56) References Cited

U.S. PATENT DOCUMENTS
6,056,458 A * 5/2000 Lin .............................. 400/477
* cited by examiner

*Primary Examiner* — Robert Pascal
*Assistant Examiner* — Khiem Nguyen
(74) *Attorney, Agent, or Firm* — Altis Law Group, Inc.

(57) ABSTRACT

A keyboard includes a keyboard body, a first resistor, a first capacitor, a jumper block mounted to the keyboard body, a battery, a keyboard interface, and a keyboard control circuit. The jumper block includes a grounded first pin and a second pin. The battery includes a positive terminal grounded by the first resistor and the first capacitor connected in series, and a grounded negative terminal. The keyboard interface includes a data pin, a voltage pin, and an idle pin. The idle pin is connected to a node between the first resistor and the first capacitor, and connected to the second pin of the jumper block. The keyboard control circuit is connected to the data pin to transmit data, and connected to the voltage pin to receive a voltage.

12 Claims, 3 Drawing Sheets

KEYBOARD WITH CIRCUIT FOR CLEARING CMOS DATA

BACKGROUND

1. Technical Field

The present disclosure relates to a keyboard with a circuit for clearing complementary metal oxide semiconductor (CMOS) data.

2. Description of Related Art

Jumpers are short wires or conductors mostly used to short-circuit pins of electronic devices, such as motherboards or hard disk drives.

When the Basic Input/Output System (BIOS) settings or the CMOS chip, of a computer, are to be cleared, one can use a jumper to short-circuit certain pins on the motherboard of the computer. However, to get to the motherboard one must unscrew and remove the computer enclosure, this is time-consuming and inefficient. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
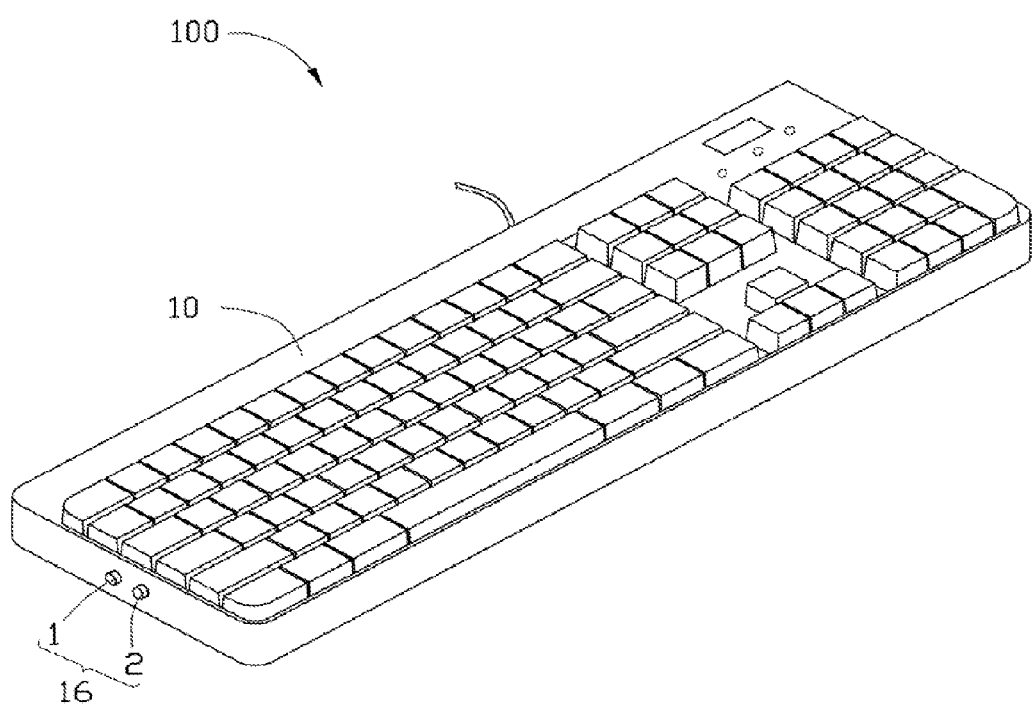
FIG. 1 is a schematic view of a keyboard in accordance with an exemplary embodiment of the present disclosure, the keyboard including a jumper block.
Figure 2:
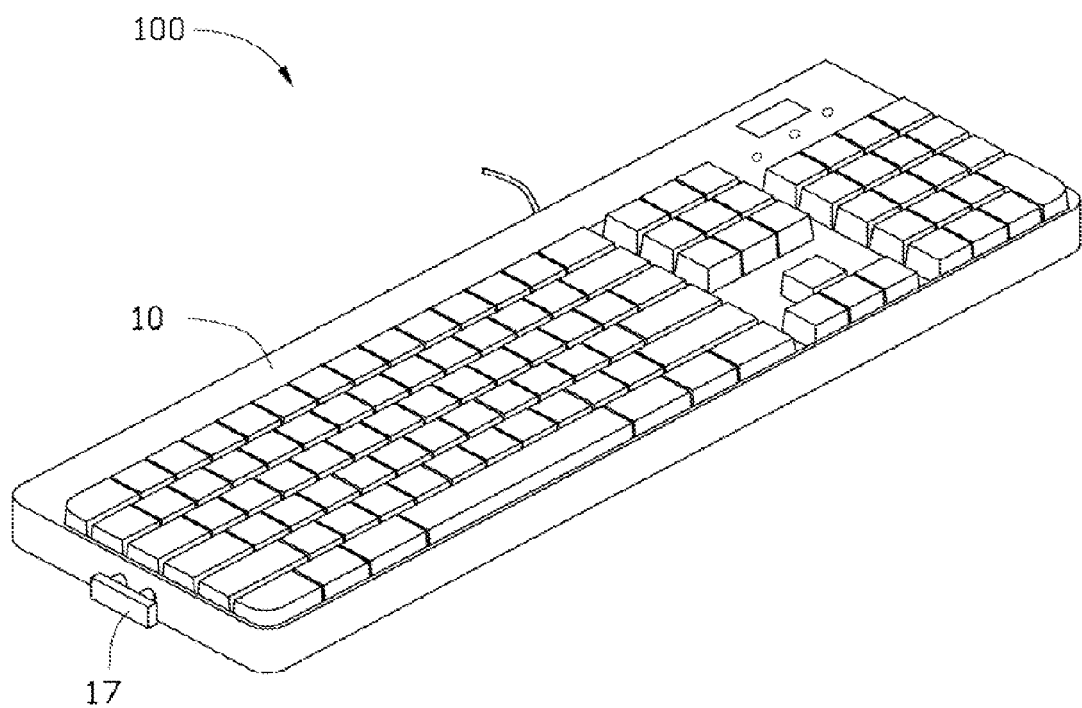
FIG. 2 is similar to FIG. 1, but showing a jumper connected to the jumper block.

Referring to FIGS. 1 and 2, an exemplary embodiment of a keyboard 100 includes a keyboard body 10, and a jumper block 16 set on an end surface of the keyboard body 10 to clear complementary metal oxide semiconductor (CMOS) data of the computer connected to the keyboard 100. The jumper block 16 includes two pins 1 and 2. The pins 1 and 2 are not connected to each other directly. The pins 1 and 2 may be set anywhere on the keyboard body 10. The pins 1 and 2 can be electrically connected together by a jumper 17.

Figure 3:
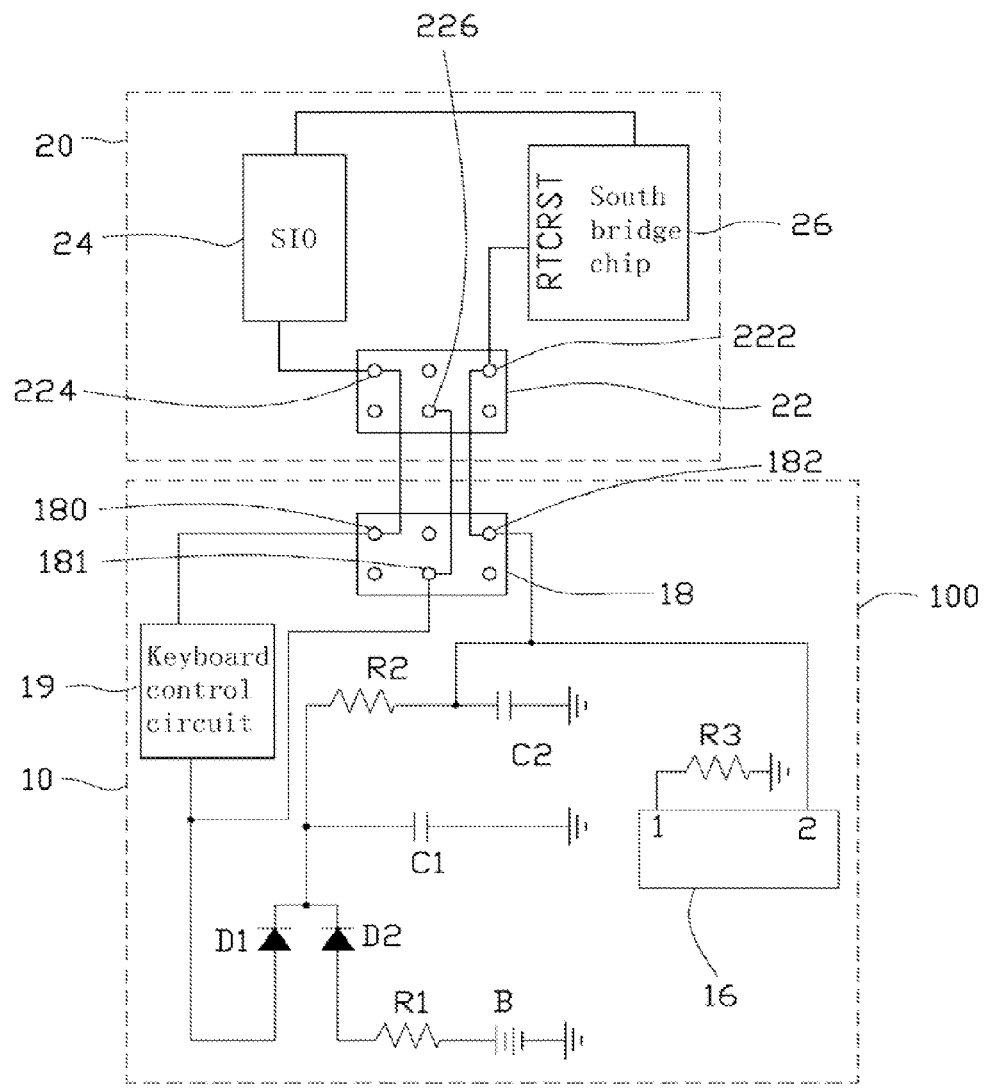
FIG. 3 is a circuit schematic diagram of a motherboard and the keyboard of FIG. 1, in accordance with an exemplary embodiment of the present disclosure.

Referring to FIG. 3, the keyboard 100 further includes a keyboard interface 18, such as a personal system/2 (PS/2) interface, a keyboard control circuit 19, a battery B, diodes D1 and D2, resistors R1-R3, and capacitors C1 and C2. The keyboard control circuit 19, the battery B, the diodes D1 and D2, the resistors R1-R3, and the capacitors C1 and C2 are mounted on a printed circuit board (not shown) received in the housing 10. The keyboard interface 18 includes a data pin 180, a voltage pin 181, and an idle pin 182. The keyboard control circuit 19 is connected to the data pin 180 and the voltage pin 181 of the keyboard interface 18 to transmit data and receive a voltage. The keyboard control circuit 19 is a known circuit of a common computer keyboard.

The voltage pin 181 of the keyboard interface 18 is also connected to an anode of the diode D1. A cathode of the diode D1 is connected to a cathode of the diode D2. An anode of the diode D2 is connected to a positive terminal of the battery B by the resistor R1. A negative terminal of the battery B is grounded. The cathode of diode D1 is grounded by the capacitor C1. The cathode of diode D1 is also grounded by the resistor R2 and the capacitor C2 connected in series. The idle pin 182 of the keyboard interface 18 is connected to a node between the resistor R2 and the capacitor C2, and connected to the pin 2 of the jumper block 16. The pin 1 of the jumper block 16 is grounded by the resistor R3.

A motherboard 20 of the computer connected to the keyboard 100 includes a keyboard socket 22, a super input/output (SIO) chip 24, and a south bridge chip 26 connected the SIO chip 24. The south bridge chip 26 includes a reset signal pin RTCRST to output reset signals to clear the CMOS data of the computer. The keyboard socket 22 includes a data pin 224 corresponding to the data pin 180 of the keyboard interface 18, a voltage pin 226 corresponding to the voltage pin 181 of the keyboard interface 18, and an idle pin 222 corresponding to the idle pin 182 of the keyboard 18. The idle pin 222 of the keyboard socket 22 is connected to the reset signal pin RTCRST of the south bridge chip 26. The data pin 224 of the keyboard socket 22 is connected to the SIO chip 24.

In use, the keyboard interface 18 is plugged into the keyboard socket 22, with the idle pin 182 connected to the idle pin 222, the data pin 180 connected to the data pin 224, and the voltage pin 181 connected to the voltage pin 226. When the computer is not powered on, the battery B provides a voltage to the diode D2 by the resistor R1, to turn on the diode D2. The battery B outputs a high level signal to the reset signal pin RTCRST of the south bridge chip 26 by the idle pins 182 and 222. When the reset signal pin RTCRST of the south bridge chip 26 receives the high level signal, the south bridge chip 26 does not clear CMOS data. At this time, if the motherboard 20 is powered on, the motherboard 20 will execute an operation system of the computer according to CMOS data stored in the south bridge chip 26. After the computer is powered on, the keyboard interface 18 receives a direct current (DC) voltage from the keyboard socket 22 and supplies the DC voltage to the diode D1, to turn on the diode D1. The keyboard interface 18 outputs the high level signal to the reset signal pin RTCRST of the south bridge chip 26 by the resistor R2, and the idle pins 182 and 222. When the reset signal pin RTCRST of the south bridge chip 26 receives the high level signal, the south bridge chip 26 does not clear CMOS data.

If the south bridge chip 26 needs to clear CMOS data, the computer is powered off, the jumper 17 can be plugged into the pins 1 and 2 of the jumper block 16. Because the pin 1 of the jumper block 16 is grounded by the resistor R3, the pin 2 of the jumper block 16 outputs a low level signal to the reset signal pin RTCRST of the south bridge chip 26 by the idle pins 182 and 222. When the reset signal pin RTCRST of the south bridge chip 26 receives the low level signal, the south bridge chip 26 clears the CMOS data. If the jumper 17 is removed from the pins 1 and 2 of the jumper block 16, the reset signal pin RTCRST of the south bridge chip 26 is reset at the high level signal, and the south bridge chip 26 resets the CMOS data.

In one embodiment, the diodes D1 and D2 can prevent reverse current. In other embodiments, the diodes D1 and D2 may not be included in the circuit according to need.

The keyboard 100 can trigger the reset signal pin RTCRST of the south bridge chip 26 through connecting the jumper 17 to the pins 1 and 2 of the jumper block 16, to clear COMS data.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A keyboard comprising:
    a keyboard body;
    a first resistor;
    a first capacitor;
    a jumper block mounted to the keyboard body, the jumper block comprising a grounded first pin and a second pin, the first pin and the second pin exposing through the keyboard body;
    a battery comprising a positive terminal grounded by the first resistor and the first capacitor connected in series, and a grounded negative terminal;
    a keyboard interface comprising a data pin, a voltage pin, and an idle pin, the idle pin connected to a node between the first resistor and the first capacitor, and connected to the second pin of the jumper block; and
    a keyboard control circuit connected to the data pin to transmit data, and connected to the voltage pin to receive a voltage.

2. The keyboard of claim 1, wherein the first and second pins of the jumper block are mounted on an end of the keyboard body.

3. The keyboard of claim 1, further comprising a first diode and a second diode, wherein an anode of the first diode is connected to the voltage pin of the keyboard interface, a cathode of the first diode is connected to the first resistor opposite to the anode between the first resistor and the first capacitor, an anode of the second diode is connected to the positive terminal of the battery, a cathode of the second diode is connected to the cathode of the first diode.

4. The keyboard of claim 3, further comprising a second resistor, a second capacitor, and a third resistor, wherein the second resistor is connected between the positive terminal of the battery and the anode of the second diode, the second capacitor is connected between the cathode of the second diode and ground, the third resistor is connected between the first pin of the jumper block and ground.

5. The keyboard of claim 1, wherein the keyboard interface is a personal system/2 interface.

6. The keyboard of claim 1, further comprising a jumper detachably connected to the first and second pins of the jumper block, wherein the first and second pins of the jumper block are connected, thereby complementary metal oxide semiconductor data of a motherboard connected to the keyboard interface can be cleared, in response to the jumper being connected to the first and second pins of the jumper block.

7. A computer system comprising:
    a motherboard comprising:
        a south bridge chip comprising a reset signal pin, to clear complementary metal oxide semiconductor data;
        a super input/output (SIO) chip connected to the south bridge chip; and
        a keyboard socket comprising a data pin connected to the SIO chip, a voltage pin, and an idle pin connected to the reset signal pin of the south bridge chip; and
    a keyboard comprising:
        a keyboard body;
        a first resistor;
        a first capacitor;
        a jumper block mounted to the keyboard body, the jumper block comprising a grounded first pin and a second pin;
        a battery comprising a positive terminal grounded by the first resistor and the first capacitor connected in series, and a grounded negative terminal;
        a keyboard interface comprising a data pin connected to the data pin of the keyboard socket of the motherboard, a voltage pin connected to the voltage pin of the keyboard socket of the motherboard, and an idle pin connected to a node between the first resistor and the first capacitor, connected to the second pin of the jumper block, and connected to the idle pin of the keyboard socket of the motherboard; and
        a keyboard control circuit connected to the data pin of the keyboard interface to transmit data, and connected to the voltage pin of the keyboard interface to receive a voltage.

8. The computer system of claim 7, wherein the keyboard socket is a personal system/2 socket.

9. The computer system of claim 7, wherein the first and second pins of the jumper block are mounted on an end of the keyboard body.

10. The computer system of claim 7, further comprising a first diode and a second diode, wherein an anode of the first diode is connected to the voltage pin of the keyboard interface, a cathode of the first diode is connected to the first resistor opposite to the anode between the first resistor and the first capacitor, an anode of the second diode is connected to the positive terminal of the battery, a cathode of the second diode is connected to the cathode of the first diode.

11. The computer system of claim 10, further comprising a second resistor, a second capacitor, and a third resistor, wherein the second resistor is connected between the positive terminal of the battery and the anode of the second diode, the second capacitor is connected between the cathode of the second diode and ground, the third resistor is connected between the first pin of the jumper block and ground.

12. The computer system of claim 7, further comprising a jumper detachably connected to the first and second pins of the jumper block of the keyboard, wherein the first and second pins of the jumper block are connected, thereby complementary metal oxide semiconductor data can be cleared, in response to the jumper being connected to the first and second pins of the jumper block.

* * * * *